US007000328B1

(12) United States Patent
Iliff

(10) Patent No.: US 7,000,328 B1
(45) Date of Patent: Feb. 21, 2006

(54) SURVEYOR'S TOOL

(76) Inventor: Donald Iliff, 959 Ziegler, Aurora, IL (US) 60505

( * ) Notice: Subject to any disclaimer, the term of this patent is extended or adjusted under 35 U.S.C. 154(b) by 0 days.

(21) Appl. No.: 10/677,872

(22) Filed: Mar. 4, 2004

(51) Int. Cl.
*G01B 1/00* (2006.01)

(52) U.S. Cl. ............................ 33/544; 33/333; 33/343

(58) Field of Classification Search .................. 33/542, 33/544, 333, 343, 391, 451, 293, 294, 295, 33/296

See application file for complete search history.

(56) References Cited

U.S. PATENT DOCUMENTS

| | | | | | |
|---|---|---|---|---|---|
| 312,266 | A | * | 2/1885 | Gurley | 33/373 |
| 1,428,669 | A | * | 9/1922 | Watson | 33/295 |
| 3,105,303 | A | * | 10/1963 | Frizzell | 33/342 |
| 3,187,437 | A | * | 6/1965 | Hampton | 33/451 |
| 3,460,260 | A | * | 8/1969 | Sarlandt | 33/292 |
| 3,862,500 | A | * | 1/1975 | Wibom | 33/333 |
| 3,879,132 | A | * | 4/1975 | Myeress | 356/153 |
| 3,890,717 | A | * | 6/1975 | Haun | 33/413 |
| 3,922,921 | A | * | 12/1975 | Woo | 33/392 |
| 3,967,381 | A | * | 7/1976 | Chesbro | 33/451 |
| 3,995,373 | A | * | 12/1976 | Brumbelow | 33/542 |
| 4,290,207 | A | * | 9/1981 | Browning et al. | 33/295 |
| 4,394,799 | A | * | 7/1983 | Moree et al. | 33/343 |
| 4,527,339 | A | * | 7/1985 | Brunson | 33/293 |
| 4,607,437 | A | * | 8/1986 | McSorley et al. | 33/374 |
| 4,635,377 | A | * | 1/1987 | Park | 33/451 |
| 4,803,784 | A | * | 2/1989 | Miller | 33/293 |
| 4,993,160 | A | * | 2/1991 | Fraley | 33/286 |
| 5,154,000 | A | * | 10/1992 | Mahoney et al. | 33/371 |
| 5,309,644 | A | * | 5/1994 | Robinson et al. | 33/293 |
| 5,671,160 | A | * | 9/1997 | Julian | 702/94 |
| 2002/0066193 | A1 | * | 6/2002 | Hodge | 33/293 |
| 2003/0226272 | A1 | * | 12/2003 | Finefield | 33/542 |

* cited by examiner

*Primary Examiner*—R. Alexander Smith
(74) *Attorney, Agent, or Firm*—Robert L. Marsh

(57) ABSTRACT

A surveyor's tool to facilitate the measurement of the elevation of an invert within a manhole includes a rod with a dimensioning along its length. The tool further includes a slide moveable with respect to said rod. The slide includes a pair of opposing arms, the arms extending from opposite sides of the slide and extending perpendicular to the length of the rode. The slide further includes an inclinometer for measuring the angle of incline of the rod. Using the length of the rod extending into the manhole and the angle of the rod as determined by the inclinometer the depth of the invert can be calculated.

13 Claims, 5 Drawing Sheets

SURVEYOR'S TOOL

The present invention relates to surveying and to a tool enabling a surveyor to site the elevation of a pipe entering a union box below a manhole.

BACKGROUND OF THE INVENTION

In addition to measuring the elevation of the surface of the ground, surveyors site the elevation of underground fixtures such as sewer pipes and the like. A sewer system comprises a plurality of underground pipes for transporting water and sewage from one portion of a municipality to another and surveyors are called upon to site the elevation of those pipes. An underground sewer system typically has a plurality of union boxes to which underground pipes connect, and the union boxes are accessible through manholes, which typically open to a street overhead.

To site the elevation of a pipe entering into a union box positioned below a manhole, a surveyor must extend an elongate member having dimensions thereon into the manhole until the end of the elongate member makes contact with the portion of the pipe the elevation of which is desired. Thereafter, the surveyor must determine the length of the portion of the elongate member that extends into the manhole. This may be done by reading dimensions printed along the elongate member at a known elevation, for example, the elevation of the upper edge of the manhole, or by placing a mark on the pole and measuring the distance from the mark to the end of the pole. The surveyor must also factor in the angle at which the elongate member extends through the manhole. Once the length of the elongate member extending into the manhole and the angle of incline are known, the elevation of the lower end of the elongate member can be calculated using simple trigonometry.

The tools needed to measure the elevation of a pipe connecting into a union box are the elongated member with dimensions along the length thereof, and a device for determining the angle of incline of the member. It may also be desirable to provide a second elongate member to extend across the upper surface of a manhole for providing a marker to be read against the dimensions of the elongate member to simplify the reading of the length extending into the manhole. A device for measuring the incline of the elongate member is also needed.

Although the process appears simple, as a practical matter surveyors have great difficulty in accurately measuring the elevation of pipes that connect into union boxes accessible only through a manhole. First, the end of the elongate member, typically a range pole or a level rod, must be maintained in contact with the pipe while the measurements are being made. Second, it is difficult to properly determine the portion of the length of the elongate member extending into the manhole. And third, it is difficult to determine the angle of inclination of the elongate member while the distal end thereof remains in contact with the portion of the pipe, the elevation of which is desired. The parts tend to move with respect to one another. Also, the reading of the angle of the elongate member may not measure the maximum angle of inclination unless the angle is measured from a plumb. The consequences will be that the final calculation of the elevation of the pipe will be incorrect.

There are numerous devices intended to solve the forgoing problem, but as a practical matter the parts that make up the devices of the prior art are difficult to store and carry and are therefore generally not in current use by surveyors. It would be desirable therefore, to provide an improved device for measuring the elevation of a pipe entering a union box below a manhole.

SUMMARY OF THE INVENTION

Briefly, the present invention is a device for measuring the elevation of a member positioned below a manhole having an upper surface, the device including (1) an elongate pole having a longitudinal axis and preferably having a dimensioning printed along a length thereof, (2) a slide moveable along the pole, (3) extension means on the slide for extending perpendicular to the axis of the pole, the extension means for resting on the upper surface of the manhole. The device further includes (4) a marker on the slide for marking against the dimensioning of the pole to determine the length thereof extending below the manhole. In the preferred embodiment, the marker is positioned to align with a portion of the pole having an elevation equal to the elevation of the rim of the manhole while the extension means engage the upper surface of the manhole. The device further includes (5) an inclinometer for showing the incline of the pole at the time the measurement of the length is taken.

Surveyors typically use a range pole or a level rod for measuring elevation. Both of these tools are elongate members with some means of measuring length for determining relative elevation while the elongate member is positioned in a vertical orientation.

In accordance with the invention, the slide is moveable along the surface of the elongate member. Preferably, the slide is adapted for use with either a range pole or a level rod of the type in common use in the surveying industry.

The slide has a pair of diametrically opposed surfaces forming a retainer for slideable movement along an elongate member parallel to the axis of the range pole or level rod along which the slide is moveable. To prevent the device from falling into the open manhole, a pair of extensions or rods extend from the body of the slide, the rods extending in opposite directions from each other perpendicular to the axis of the elongate member. A marker on the slide also facilitates the accurate reading of the markings of a range pole or the site rod that extends into a manhole while the extensions retained in the retainer means engage the upper surface of the manhole. Finally, the slide includes an inclinometer for determining the angle of inclination of the elongate member and the slide.

The cross-sectional dimensions of a level rod of the type currently in use by surveyors are not identical to the cross-sectional dimensions of a range pole in current use. In one embodiment of the invention, the removable extensions that extend into the retainers on opposite sides of the slide each have a first surface and a second surface and are retainable in their retainers in either a first orientation or a second orientation. The removable members are configured such that when the slide is positioned on a range pole and the removable members are inserted into their retainers in the first orientation, the indicator on the slide will accurately read the depth of the pole when the removable members engage the upper surface of a manhole. When the slide is used in a level rod rather than a range pole, the removable members are inserted into the retainers, but in the second orientation and again the indicator will indicate the correct length of the level rod extending into the manhole when the removable members are in contact with the upper surface of a manhole.

BRIEF DESCRIPTION OF THE DRAWINGS

A better understanding of the present invention will be had after a reading of the following detailed description taken in conjunction with the drawings wherein.

DETAILED DESCRIPTION OF A PREFERRED EMBODIMENT

Figure 1:
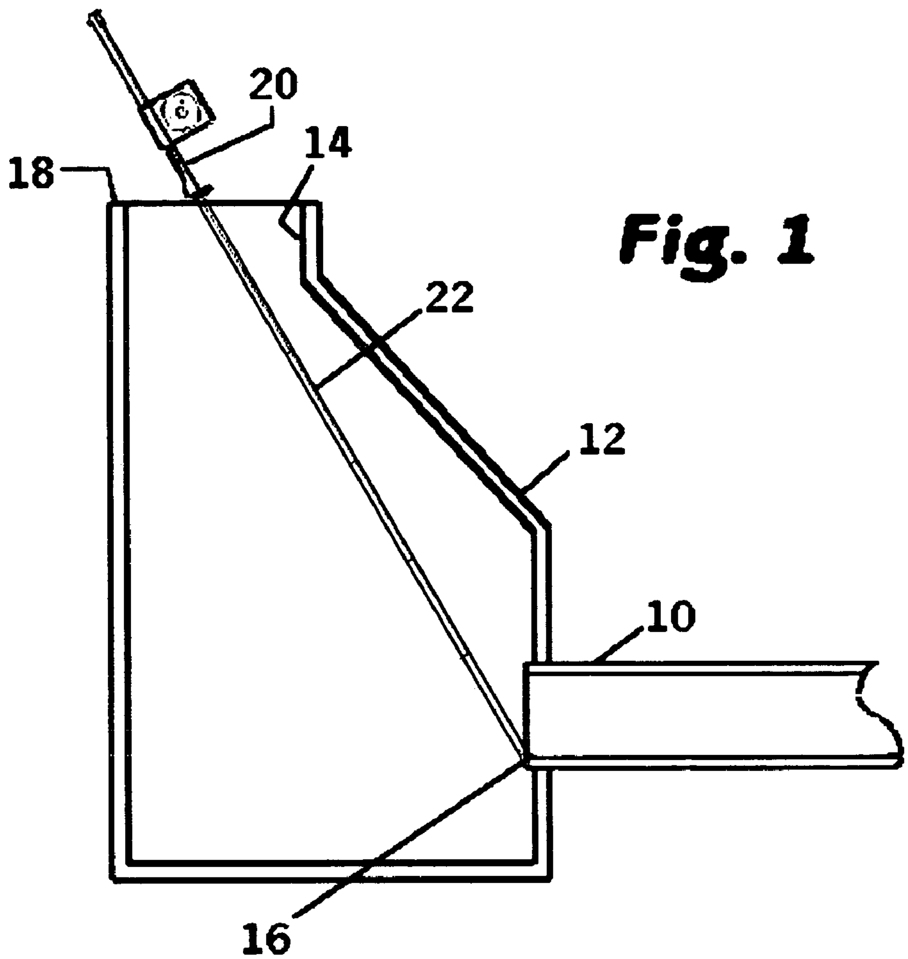
FIG. 1 is a cross-sectional view of a union box having a pipe invert opening into the union box and a manhole overhead.

Referring to FIG. 1, in order to site the elevation of an invert 10 of a length of pipe that enters into an underground union box 12 having a manhole 14 at the upper end thereof, the elevation of the lower edge 16 of the invert 10 must be determined with respect to the upper edge 18 of the manhole 14. To undertake the measurement, a device 20 in accordance with the present invention is used in conjunction with an elongate measure rod 22 such as a site rod or a range pole of the type used by surveyors.

Figure 2:
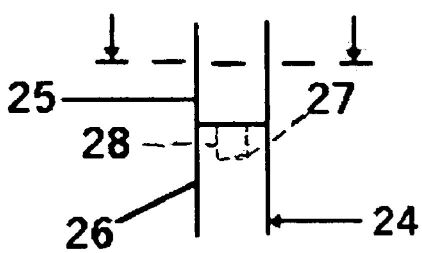
FIG. 2 is a side-elevational view of a range pole of the type used to measure elevations.
Figure 3:
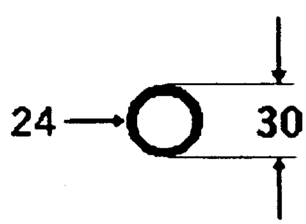
FIG. 3 is a cross-sectional view of the range pole shown in FIG. 2 taken through lines 3—3 thereof.

Referring to FIGS. 2 and 3, a range pole 24 is an elongate rigid member consisting of a plurality of elongate sections, the ends 25, 26 of two sections are shown, with the section ends retained in end-to-end relationship. Each of the sections of the range pole 24 has a cylindrical body, as shown in FIG. 3, the diameter 30 of which is about one inch. The body of each of the sections is four feet in length and the length of each of the sections is divided into four one foot long sections with each of the four sections painted a different color so as to be easily read at a distance using a transit. At one end 25 of each pole section is a threaded stud 27 and at the opposite end 26 of each pole section is a complementarily threaded bore 28 such that the sections can be threadedly attached to one another to provide a pole of any desired length.

Figure 4:
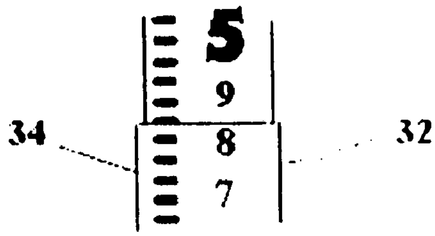
FIG. 4 is a side-elevational view of a site rod of the type in common use by surveyors.
Figure 5:
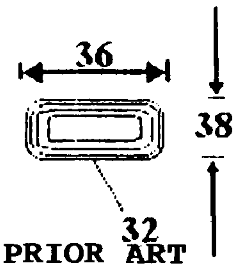
FIG. 5 is a cross-sectional view of the site rod shown in FIG. 4 taken through 5—5 thereof.

Referring to FIGS. 4 and 5, a site rod 32 currently used by surveyors is an elongate telescopic member having a plurality of sections with dimensions 34 along the length thereof and a width 36 and a thickness 38. For site rods currently in use, the average width 36 is two and one-half inches and the average thickness 38 is one and one-half inches.

Figure 6:
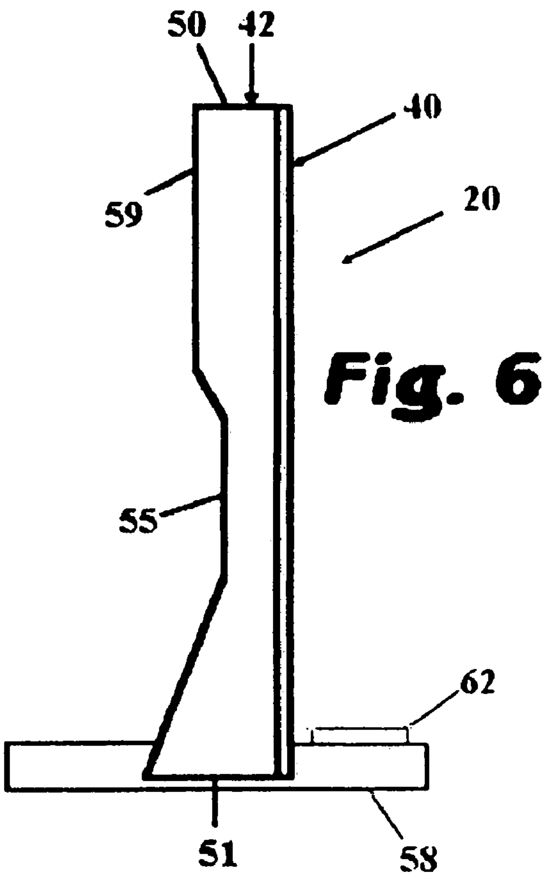
FIG. 6 is a front elevational view of a slide in accordance with the present invention.
Figure 7:
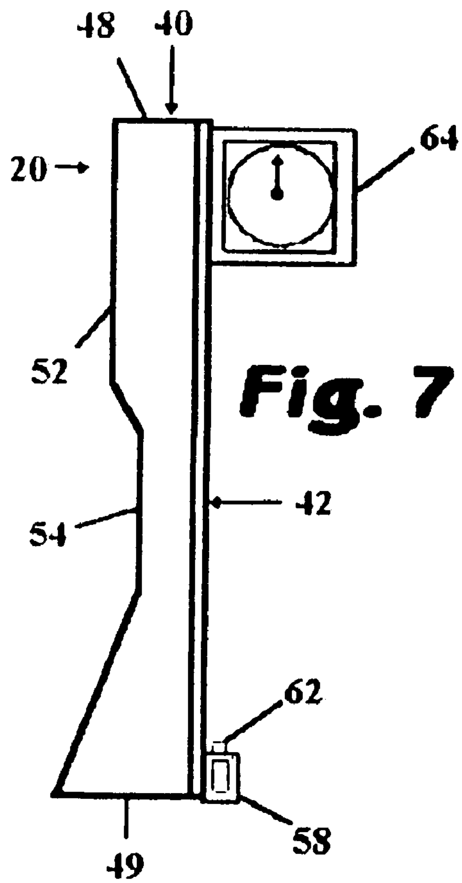
FIG. 7 is a side-elevational view of the slide shown in FIG. 6.
Figure 8:
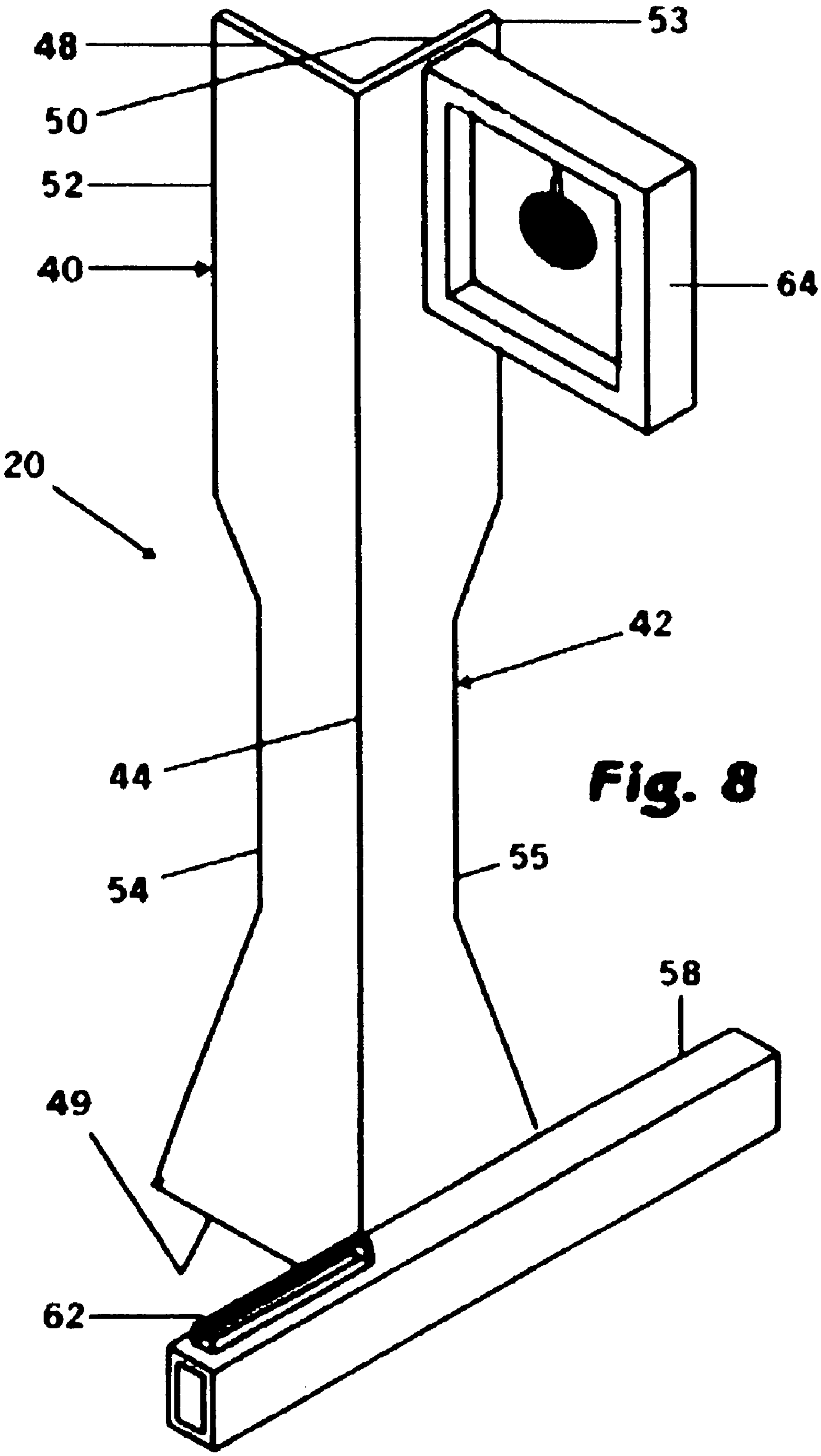
FIG. 8 is an isometric view of the slide shown in FIG. 6.

Referring to FIGS. 6 through 8, the device 20 includes a first planar panel 40 having an overall length of about one foot. Secured along one long edge of the first planar panel 40 is one long edge of a second planar panel 42, with the panels 40, 42 oriented perpendicular thereto to form a right angle intersection 44. Each of the panels 40, 42 are generally rectangular in shape, with the parallel opposing short sides 48, 49 and 50, 51 thereof respectively having a width of about one and one-half inches. The long side 52, 53 opposite the right angle intersection 44 of the panels 40, 42 may have indentations 54, 55 therein to facilitate gripping with the human hand.

The device further includes an inclinometer 64 positioned to measure the inclination of the second panel 42 with respect to the vertical. It should be appreciated that numerous inclinometers are known in the art and such devices can be inexpensively acquired and made part of the device 20.

Figure 9:
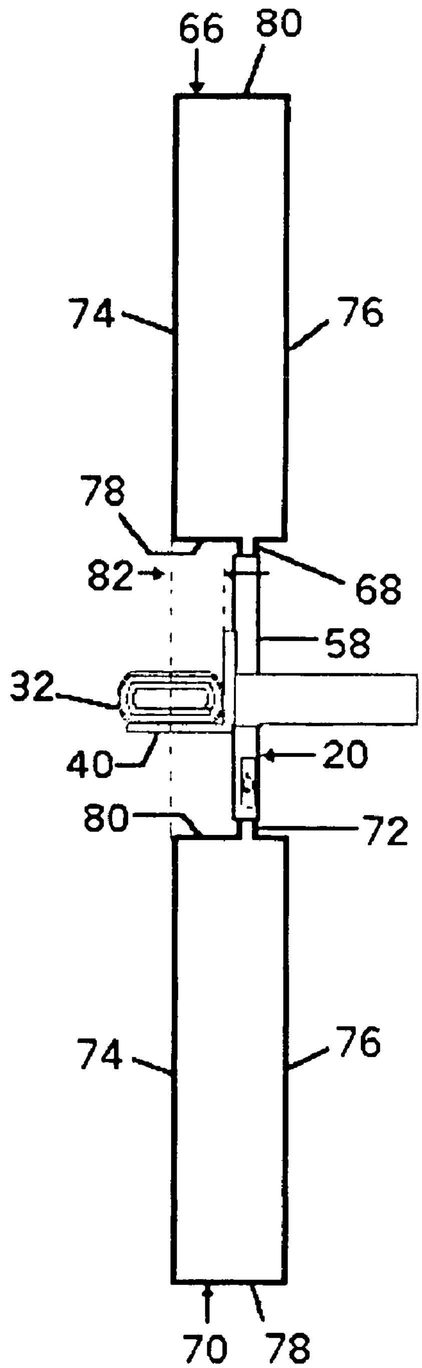
FIG. 9 is an end view of the slide shown in FIG. 7, reduced in size and fitted around a site rod, shown in cross-section as in FIG. 5, with removable arms extending from opposing sides of the slide.
Figure 10:
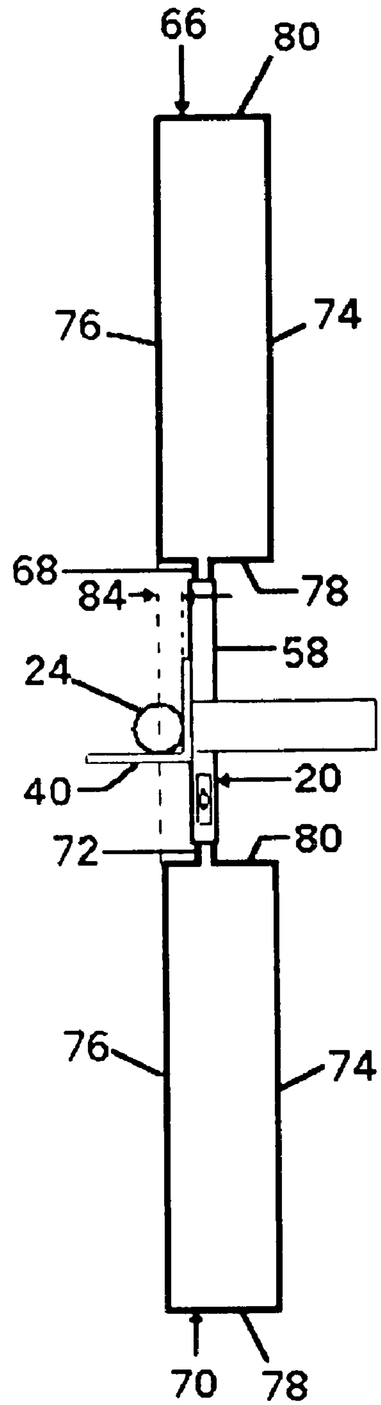
FIG. 10 is an end view of the slide shown in FIG. 7 fitted around a range pole, shown in cross-section as in FIG. 3, with the slide fitted with the removable arms shown in FIG. 9 inserted in their alternate configuration; and, FIG. 11 is an isometric view of a slide having a retainer in accordance with a second embodiment of the invention.

Referring to FIGS. 9 and 10, the device 20 further includes a first, generally rectangular removable arm 66 having an elongate retaining portion 68 extending from one end thereof fitted into one end of the retainer 58 of device 20, and a second, generally rectangular removable arm 70 having a second retainer portion 72 extending from one end thereof and inserted into the opposite end of the retainer 58 of device 20. The first removable arm 66 is identical to the second removable arm 70 with the exception that the retaining portion of the second removable arm 72 extends in the opposite direction from the generally rectangular body thereof. This is because the second removable arm 70 extends in the opposite direction from the first arm 66 with respect to the device 20.

The retaining portions 68, 72 of the first and second arms 66, 70 have a generally rectangular cross-section, sized to be slideably received within the rectangular opening of the tubular retainer 58 such that the arms 66, 70 will not rotate with respect to the retainer 58. The body of each of the arms 66, 70 have parallel long sides 74, 76 and opposing parallel short sides 78, 80. The retaining portion 68 of the first removable arm 66 extends from one of the short sides 78 parallel to the long sides 74, 76, while the retaining portion 72 of the second removable arm 70 extends from short side 80 and is likewise parallel to the long side 74, 76. The retaining portions 68, 72 are not centered with respect to the short side 78, 80 from which they extend. The body of the removable arms 66, 70 are made of a rigid material, such as a metal or plastic, and have sufficient thickness to remain rigid and resist breakage.

The retaining portions 68, 72 are rectangular in cross-section and have cross-sectional dimensions that are a little less than the cross-sectional dimensions of the inner rectangular opening of the retainer 58 such that the retaining portions 68, 72 can be removably inserted into the retainer 58 in two orientations. Also, the retaining portions 68, 72 are not centered with respect to the short side 78, 80 from which they extend, and therefore, the retaining portions 68, 72 can be inserted with the arms 66, 70 in either of two orientations, the two orientations being shown in FIGS. 9 and 10. In the orientation depicted in FIG. 9, the long sides 74 of each of the arms 66, 70 is offset from the associated retaining portion 68, 72 a distance 82 that is equal to one half the width of a site or level rod 32. Alternately, when the arms 66, 70 are inserted into the retainer 58 in the second orientation as shown in FIG. 10, the offset of the retaining portions 68, 72 with respect to the long sides 76 a distance 84 equal to one half the diameter of a range pole 24.

Referring to FIGS. 6 through 8, extending along the short side 51 of the second panel 42 is an elongate tubular retainer 58 having a rectangular cross-section in FIGS. 7 and 8), and mounted to one surface of the tubular retainer 58 is a level bubble 62 oriented so that the bubble will read level when the arms 66,70 are horizontally corner.

Referring further to FIG. 1, the device 20 can therefore be fitted to either a range pole 32 or a site rod 24 with the orientation of the removable arms 66, 70 inserted into the retainer 58 such that one long edge 74, 76 thereof defines the center of the cross-section of the selected measuring rod 22. The measuring rod 22 can thereafter be inserted through the manhole 14 with the distal end thereof against the lower edge 16 of the invert 10. The device 20 is positioned on the measuring rod 22 with the removable arms 66, 70 resting on the upper edge 18 of the manhole 14. The level bubble 62 should be centered to indicate that the angle of the measuring rod 22 will be accurately measured by the inclinometer 64. Thereafter, the angle of the inclinometer 64 can be read and the indicator edge 49 of the device 20 can be aligned against the measurements of the measuring rod 22 to determine the length of the rod 22 extending into the manhole 14. Using simple trigonometry, knowing the length of the pole 22 extending into the manhole and the angle from the inclinometer 64, the depth of the lower edge 16 of the invert 10 can be accurately determined.

Figure 11:
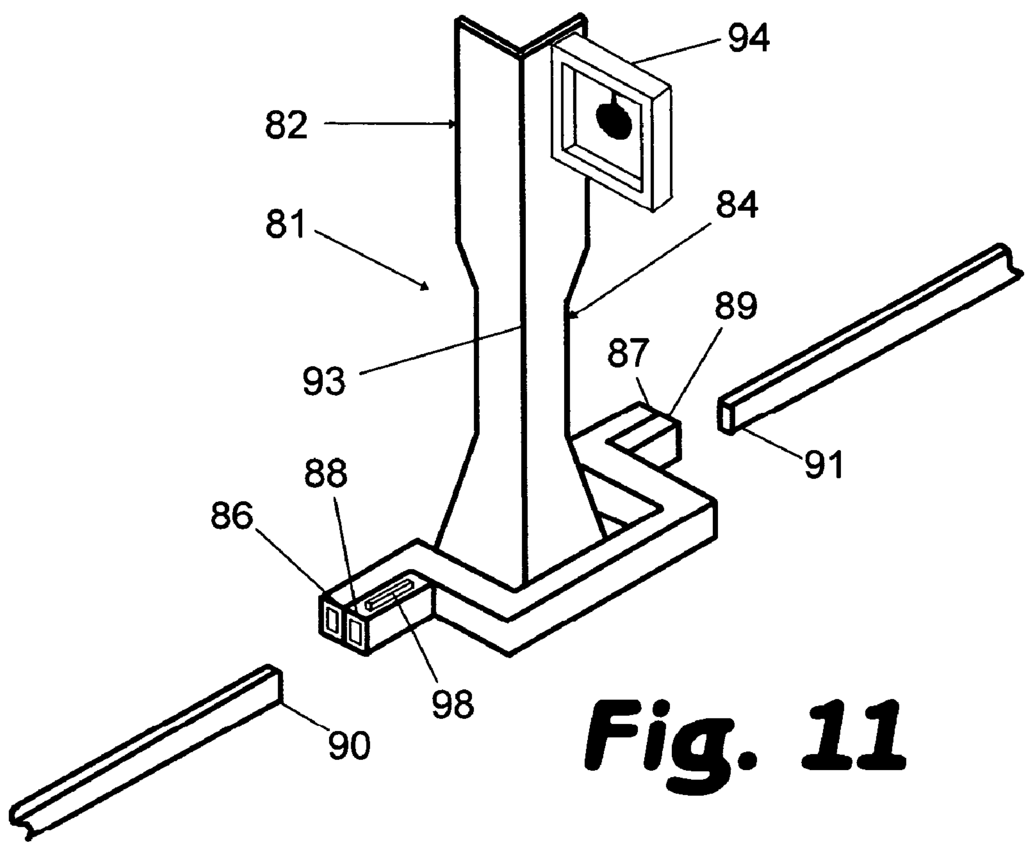

A second embodiment of the invention is depicted in FIG. 11 in which a slide 81 consists of a first planar panel 82 having an inner edge joined to the inner edge of a second planar panel 84 to form a right angle such that the slide 81 is moveable along an elongate measuring rod 22. The elongate measuring rod 22 may be a range pole 24, a site rod 32, or any other elongate member the length of which can be determined. To be useable by the surveying industry and in conjunction with the slide 81, the cross-sectional dimensions of any other elongate member must be known.

In accordance with the second embodiment, the slide 81 has a plurality of retainers 86, 87, 88, 89 for retaining the ends of elongate members. Each of the retainers 86–89 consists of a tubular member with a rectangular inner opening sized to receive the end of a pole 90, 91. The tubular members which constitute the retainers 86–89 are oriented to retain the poles 90, 91 with the axis thereof parallel to the second planar panel 84 and perpendicular to the edge 93 formed by the intersection of the first and second planar panels 82, 84. The retainers 86–90 are arranged in pairs, with opening of each of the pairs directed linearly opposing each other, the first pair of aligned retainers bearing indicia numbers 86, 87 and the second pair of aligned retainers bearing numbers 88, 89. In accordance with the invention, the first pair of aligned retainers 86, 87 are offset from the inner surface of the second planar 84 a distance, not shown, such that when the poles 90, 91 are inserted into the retainers 86, 87, an edge of the poles 91, 91 will intersect the center of a level rod 32. Similarly, when the poles 90, 92 are inserted into the second pair of aligned retainers 88, 89, an edge of the poles 90, 91 will be aligned with the center of a range pole 24 engaged by the slide 81.

In addition to the retainers 86–89 the second embodiment includes an inclinometer 94 adapted to measure the angle of incline of an elongate member 22 against which the slide 81 is mounted. Positioned parallel to the aligned retainers 86–89 is a spirit level or level bubble 98 for ensuring that the inclinometer accurately reads the angle of inclination of the elongate measuring rod 22 when it is extended into the opening of an manhole 14 and against the edge of an invert 10.

It should be appreciated that a slide 81 can be adapted to include a third pair of linearly aligned pair of opposing retainers such as the pair of retainers 86, 87 and the pair 88, 89. The third set of retainers, not shown, would be positioned to align an edge of the pole 90, 91 to intersect a center line of a third measuring rod useable in the surveying industry and having cross-sectional dimensions which are different from those of a range pole 24 or a site rod 32.

While the present invention has been described with respect to a single embodiment, it will be appreciated that many modifications and variations may be made without departing from the true spirit and scope of the invention. It is therefore the intent of the appended claims to cover all such variations and modifications that fall within the spirit and scope of the invention.

The invention claimed is:

1. A device for measuring the depth of a point in a manhole where said manhole has an upper surface, said device comprising an elongate pole, said pole having a longitudinal axis and a width, a slide moveable along said pole, extension means on said slide, said extension means extending perpendicular to said axis of said pole, said extension means for resting on said upper surface of said manhole, said extension means having a longitudinal edge, a marker on said slide for marking a length of said pole, said marker aligned with said extension means for reading a length of said pole below said manhole upper surface, an inclinometer for determining the angle of incline of said dimensioned pole, and said edge of said extension means intersecting a midpoint of said elongate pole wherein said reading of length is taken at a centerline of said pole.

2. The device of claim 1 and further comprising a second elongate pole, said second elongate pole having a width different from said width of said elongate pole, said extension means having a second longitudinal edge, said extension means having a first orientation on said slide and a second orientation on said slide, and said second longitudinal edge of said extension means intersecting a midpoint of said width of said second elongate pole when said extension means is in said second orientation.

3. The device of claim 2 wherein said elongate pole is a range pole and said second elongate pole is a site rod.

4. The surveyor's tool of claim 2 and further comprising an angle indicating means oriented to read perpendicular to a reading of said inclinometer in order to provide a reading from said inclinometer with respect to a plumb.

5. A surveyor's tool for use with an elongate rod having dimensional marking thereon and having a longitudinal axis, said surveyor's tool comprising a slide for slideable movement along said elongate rod parallel to said longitudinal axis, an elongate member extending from opposite sides of said slide perpendicular to said longitudinal axis, means on said slide for determining a length of said elongate rod extending below said elongate member, an inclinometer on said slide for determining an angle of inclination of said elongate rod, and an angle indicating means oriented to read perpendicular to a reading from said inclinometer, said angle indicating means for determining when said elongate member is horizontal wherein said inclinometer will measure an angle from a plumb.

6. The surveyor's tool of claim 5 wherein an edge of said elongate member intersects a mid-point of said elongate rod.

7. The surveyor's tool of claim 6 wherein said slide further comprises adjustment means adaptable to be used with a plurality of elongate rods with each of said plurality of elongate rods having a cross sectional dimension different from any other of said plurality of elongate rods and means wherein said edge of said elongate member will intersect a mid-point of any one of said plurality of elongate rods wherein said length is measured along a centerline of any one of said plurality of elongate rods.

8. The surveyor's tool of claim 7 wherein said elongate rod is a range pole.

9. The surveyor's tool of claim 7 wherein said elongate rod is a site rod.

10. A surveyor's tool for use with an elongate rod, said elongate rod having a longitudinal axis, said tool comprising a slide for slideable movement along said elongate rod, a transverse member on said slide, said transverse member having an axis perpendicular to said axis of said elongate rod, a bubble indicator on said slide for indicating when said transverse member is horizontal, an inclinometer means on said slide, said inclinometer means for determining an angle of inclination of said elongate rod with respect to a plumb, marker means on said slide for designating a reading point along said elongate rod for measuring from said reading point to an end of said rod.

11. A surveyor's tool for determining an elevation of an object comprising an elongate rod, an inclinometer for determining an angle of inclination of said elongate rod, a bubble indicator for indicating when said inclinometer is determining an angle with respect to a plumb, and measurement means along a length of said rod.

12. The tool of claim 11 and further comprising a slide moveable along said rod, wherein said inclinometer and said bubble indicator are on said slide.

13. The tool of claim 12 and further comprising a transverse member on said slide, said transverse member having an axis perpendicular to an axis of said rod and wherein said bubble indicator indicates when said transverse member is horizontal.

* * * * *